United States Patent
Yeh et al.

(10) Patent No.: US 8,836,576 B2
(45) Date of Patent: Sep. 16, 2014

(54) POWER SAVING METHOD ADAPTABLE IN GNSS DEVICE

(75) Inventors: Hsin-Chung Yeh, Hsinchu (TW); Chi Ya Lo, Taoyuan County (TW)

(73) Assignee: Mediatek Inc., Hsin-Chu (TW)

( * ) Notice: Subject to any disclaimer, the term of this patent is extended or adjusted under 35 U.S.C. 154(b) by 1434 days.

(21) Appl. No.: 12/258,625

(22) Filed: Oct. 27, 2008

(65) Prior Publication Data

US 2010/0103038 A1    Apr. 29, 2010

(51) Int. Cl.
*G01S 19/34* (2010.01)
*G01S 19/39* (2010.01)
*G01S 19/30* (2010.01)

(52) U.S. Cl.
CPC .................. *G01S 19/34* (2013.01); *G01S 19/39* (2013.01); *G01S 19/30* (2013.01)
USPC .................................................... 342/357.74

(58) Field of Classification Search
CPC .......... G01S 19/34; G01S 19/39; G01S 19/30
USPC .............. 342/357.06, 357.12, 357.13, 357.74
See application file for complete search history.

(56) References Cited

U.S. PATENT DOCUMENTS

| | | | |
|---|---|---|---|
| 6,912,242 B2 | 6/2005 | Farine et al. | |
| 7,085,309 B2 | 8/2006 | Oesch et al. | |
| 7,102,565 B2 * | 9/2006 | Jesson | 342/357.63 |
| 7,976,937 B2 | 7/2011 | Shi et al. | |
| 2002/0004392 A1 * | 1/2002 | Farine et al. | 455/427 |
| 2003/0107514 A1 * | 6/2003 | Syrjarinne et al. | 342/357.06 |
| 2004/0153679 A1 * | 8/2004 | Fitton et al. | 713/322 |
| 2011/0116410 A1 | 5/2011 | Sung et al. | |

FOREIGN PATENT DOCUMENTS

| | | |
|---|---|---|
| JP | 2006506889 | 2/2006 |
| TW | 508914 | 11/2002 |
| TW | 544527 | 8/2003 |
| TW | M298128 | 9/2006 |
| TW | 200816668 | 4/2008 |
| TW | M341211 | 9/2008 |

OTHER PUBLICATIONS

English language translation of abstract TW M298128 (published Sep. 21, 2006).
English language translation of abstract of TW M341211 (published Sep. 21, 2008).
English language translation of abstract of TW 544527 (paged 2-3 of publication).

* cited by examiner

*Primary Examiner* — Frank J McGue
(74) *Attorney, Agent, or Firm* — McClure, Qualey & Rodack, LLP

(57) ABSTRACT

A method and system for navigation are provided to locate a GNSS device. The GNSS device comprises a RF front end receiving satellite signals of a plurality of satellites, and a GNSS device comprising a plurality of correlation channels each performing a correlation process to generate a correlation result from satellite signals corresponding to a satellite, a memory device for storage of the correlation results, and a processor performing acquisition and tracking based on the correlation results.

21 Claims, 5 Drawing Sheets

POWER SAVING METHOD ADAPTABLE IN GNSS DEVICE

BACKGROUND OF THE INVENTION

1. Field of the Invention

The invention relates to a power saving method and system adaptable in a Global Navigation Satellite System (GNSS) device.

2. Description of the Related Art

Generally, power saving is always a major concern for GNSS devices. Under some circumstance, the GNSS device does not require aggressive tracking to continuously lock onto its position. FIG. 1 is a flowchart of a conventional GNSS signal reception, in which the correlation channels and processor in the GNSS device are turned off periodically. When the satellite signals are detected to be high quality, efficiency of acquisition and tracking are significantly increased. Experiments show that it is possible to temporarily turn off related components under such a circumstance, with the tracking results remaining unaffected. In step 201, a wake up schedule is configured. The wake up schedule is used to tell the GNSS device to wake up when certain criteria are met. The criteria may comprise a time counter, a trigger from an input device, or signals from a dead reckoning device. A sleep time may be configured to tell the GNSS device of a next sleep time. Thereafter, the GNSS device enters a sleep mode, and a status determination procedure is periodically processed in step 203. Before entering the sleep mode, variables related to the position may be stored in the memory device of the GNSS device. In step 203, the criteria are checked whether the GNSS device should wake up. If so, the GNSS device wakes up in step 205. All the components including the correlation channels, the memory device and processor are initialized and powered on, and the variables are restored for further acquisition and tracking procedures. Upon a next sleep time, the GNSS device enters the sleep mode again in step 207, and the process loops back to step 203.

Since most of the components in the GNSS device are turned off, power consumption is minimized. However, when applied in conditions with rapid variation, undeterminable situations may occur, where a GNSS device in sleep mode may be unable to process. So a more flexible architecture is desirable.

BRIEF SUMMARY OF THE INVENTION

An embodiment of a navigation method is implemented in a GNSS device to locate itself. The GNSS device is part of a mobile device which comprises a RF front end for receiving satellite signals of a plurality of satellites. The GNSS device comprises a plurality of correlation channels each performing a correlation process to generate a correlation result from satellite signals corresponding to a satellite, a memory device for storage of the correlation results, and a processor performing acquisition and tracking based on the correlation results.

Each correlation channel is periodically turned on and turned off based on a corresponding correlation schedule. The processor estimates a dilution of precision based on distribution of the satellites, acquires position and dynamics of the GNSS device using the correlation results, and calculates fixed accuracy of the GNSS device based on the position. The processor further estimates signal quality for each correlation process based on satellite signals corresponding to each satellite.

Each correlation schedule comprises a period, and a duty cycle defining how long a correlation process should be enabled within the period. The processor adjusts a duty cycle of a correlation schedule based on signal quality of the satellite, dynamics of the GNSS device, the dilution of precision, and the fixed accuracy of the GNSS device. The correlation schedule is executed by the processor to turn on or turn off a correlation channel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
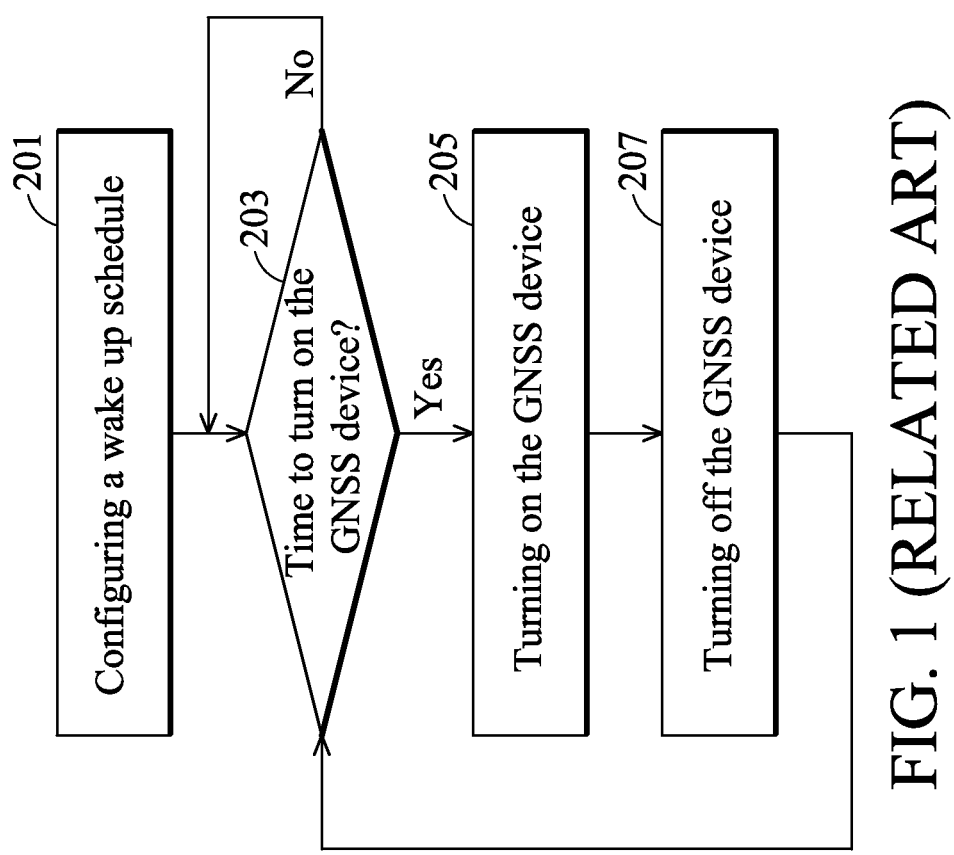
FIG. 1 is a flowchart of a conventional GNSS signal reception.
Figure 2:
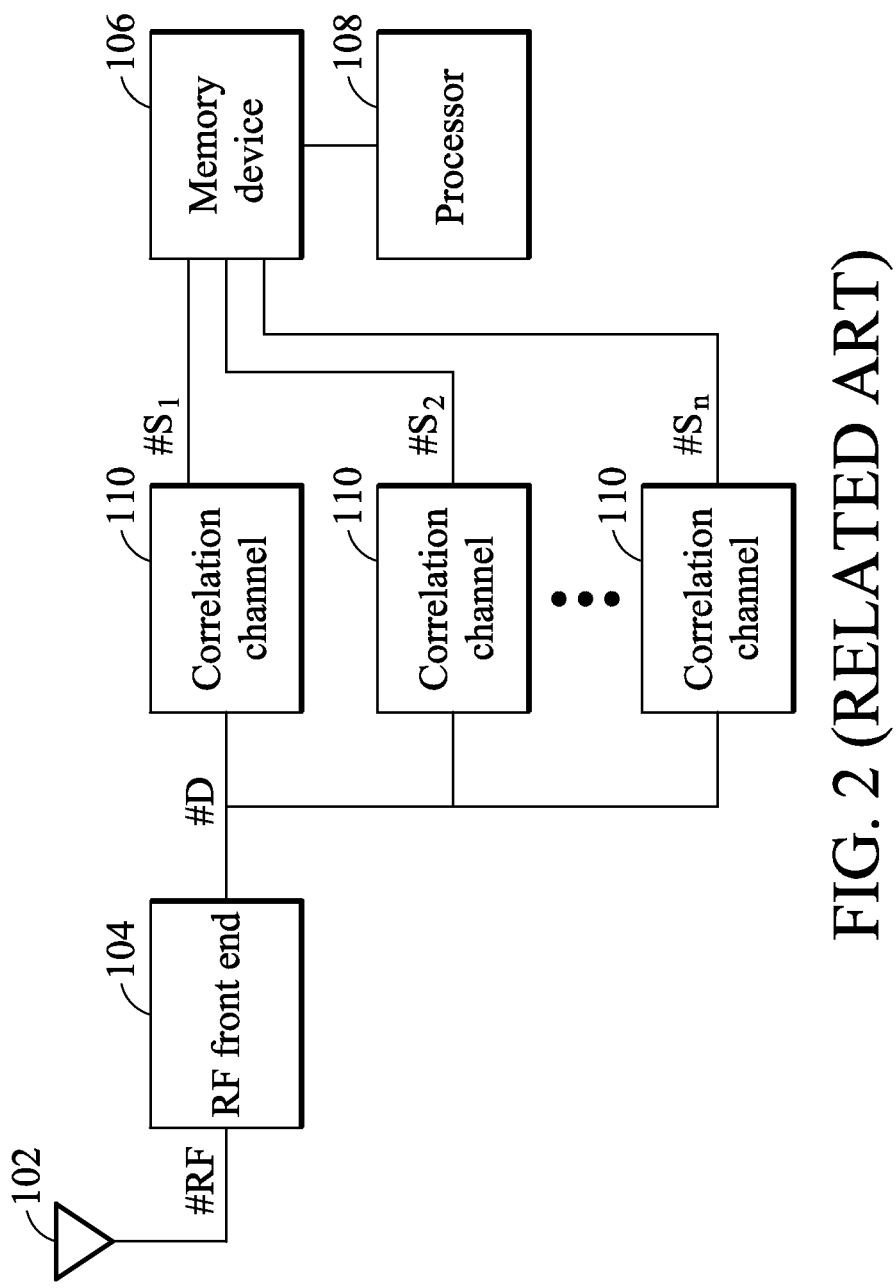
FIG. 2 shows a GNSS device according to an embodiment of the invention.

FIG. 2 shows a GNSS device. The GNSS device may conform to GPS standard (one of standards included the GNSS standard group), receiving satellite signals to locate the position. The GNSS device comprises a RF front end 104, processing a radio signal #RF received from an antenna 102, and outputs a digital signal #D to a plurality of correlation channels 110. The correlation channels 110 are physically deployed in parallel to concurrently perform correlation calculations for all satellites, and a plurality of correlation results $\#S_1, \#S_2$ to $\#S_n$ are individually generated therefrom. The correlation results $\#S_1, \#S_2$ to $\#S_n$ are stored in a memory device 106, wherein a processor 108 uses the correlation results $\#S_1, \#S_2$ to $\#S_n$ to perform acquisition and tracking.

Figure 3:
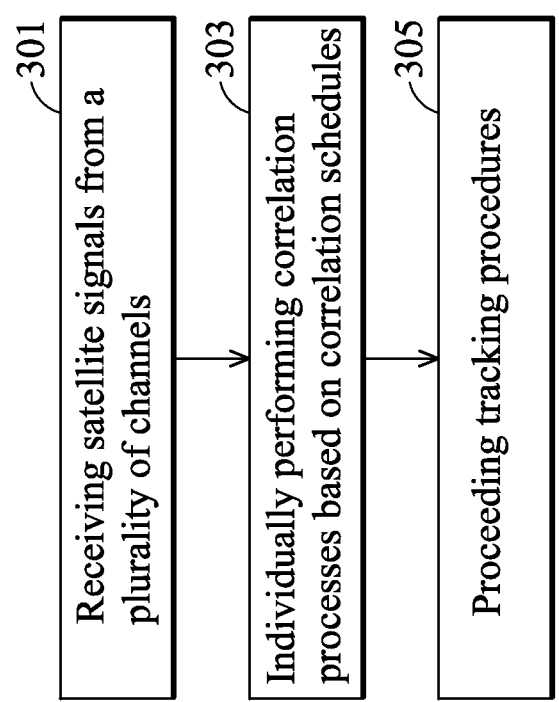
FIG. 3 is a flowchart of an embodiment of a navigation method of the invention.

FIG. 3 is a flowchart of an embodiment of a navigation method of the invention. In the embodiment, the hardware architecture is shown in FIG. 2. In the embodiment, the RF front end 104, memory device 106 and processor 108 are not turned off. The correlation channels 110 are individually managed by correlation schedules to be turned on and turned off. Specifically, it is the SNR of satellite signals that determines whether to turn on or off the correlation channels 110. Since power saving is implemented per correlation channel, some correlation channels 110 may operate continuously while others are turned off. In step 301, the RF front end 104 receives satellite signals from a plurality of satellites, and outputs a digital signal #D to the correlation channels 110. In step 303, the digital signal #D is sent to the correlation channels 110 to perform corresponding correlation processes. Generally, a correlation process is an essential step for satellite acquisition, comprising at least one coherent correlation process. There are various known approaches to perform a coherent correlation process based on the digital signal #D, so detailed description is omitted herein for brevity. Correlation results $\#S_1$ to $\#S_n$ are therefore generated from satellite signals corresponding to each satellite. In step 305, further acquisition and tracking procedures are then performed based on the correlation results.

Figure 4:
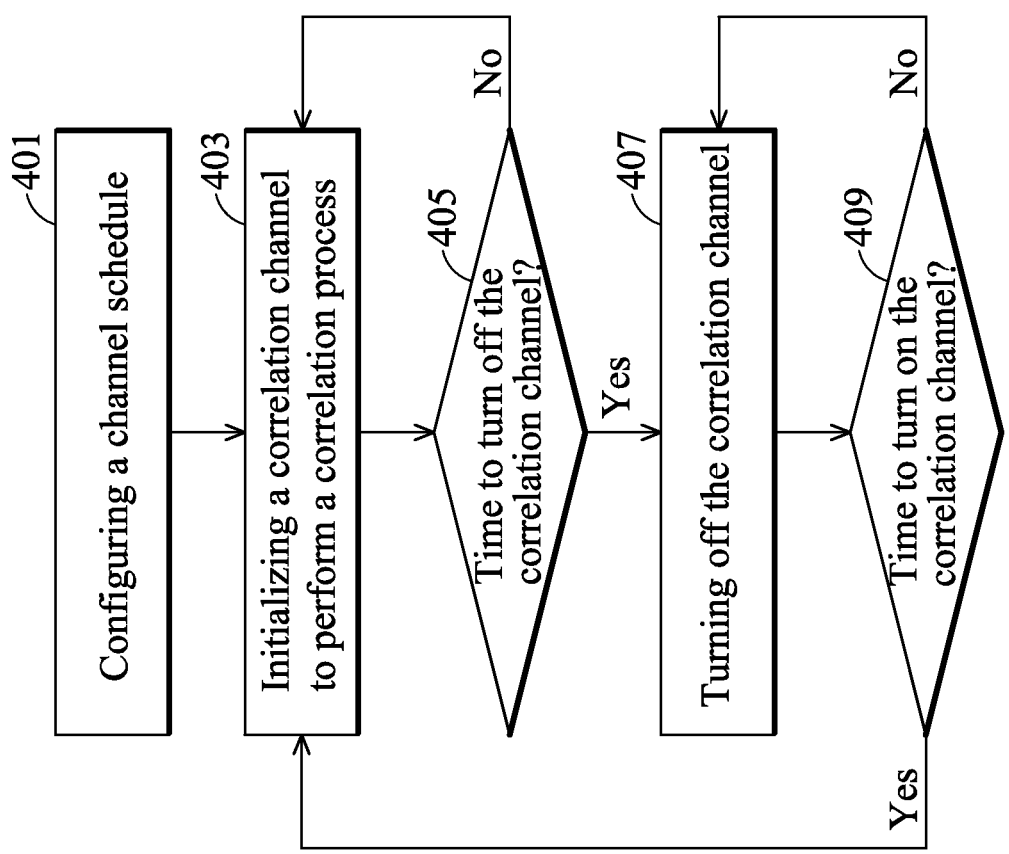
FIG. 4 is a flowchart of an operation based on a correlation schedule of the invention.

In the embodiment, the correlation processes in step 303 are individually turned on or off based on corresponding correlation schedules, and the occurrences of turning on and off are defined as duty cycles. A flowchart of a correlation process based on a correlation schedule of the invention is shown in FIG. 4. In step 401, a correlation schedule is configured. The correlation schedule defines duty cycle of a correlation channel 110 within a certain period. A duty cycle defines a ratio of active and inactive periods of a correlation channel 110, and the periods are determined based on various states of the GNSS device. For example, when the processor 108 acquires position and dynamics of the GNSS device using the correlation results in step 305, a dilution of precision (DOP) can then be estimated based on distribution of the satellites. Dynamics of the GNSS device at least includes one of the velocity and acceleration of the GNSS device. If the GNSS device moves fast, the inactive period should be reduced. On the contrary, a longer inactive period is preferable for a slowly moving GNSS device. The DOP affects accuracy of position estimation. For example, longer active period is required to lock on the position when the DOP is disqualified. Since the position is continuously updated during the active period, fixed accuracy of it can also be estimated according to variation errors thereof. Signal qualities of each satellite, such as signal to noise ratios (SNRs), can be estimated from corresponding satellite signals. A shorter active period may be sufficient to acquire accurate positioning when the signal qualities are good. Thus, the duty cycle of a correlation schedule can be decided based on one or more of the described variables including signal quality, dynamics of the GNSS device, the DOP, and the fixed accuracy of the GNSS device.

When scheduled, in step 403, the correlation channel 110 is initialized to perform a correlation process for an active period defined by the correlation schedule. The correlation channel 110 may comprise a coherent module and an incoherent module (not shown). The coherent module performs a coherent correlation process on the satellite signals to form a matrix of frequency shifts and code phases. In the matrix, correlation values corresponding to presumed pairs of frequency shifts and code phases are accumulated within a period of coherent integration time. The coherent integration time is typically 20 ms according to GPS standard. The incoherent module performs an incoherent correlation process, summing a plurality of matrixes formed in different brief periods to acquire a peak value corresponding to a pair of frequency shift and code phase. Theoretically, the pair of frequency shift and code phase is a desired correlation result $\#S_n$, which is then sent to an acquisition and tracking procedure. Signal power may also be acquired from the incoherent module.

When the correlation channel 110 is active, the processor 108 follows the correlation schedule to monitor whether the correlation channel 110 should be turned off in step 405. If the active period is not run out, the process loops back to step 403, thereby the correlation process proceeds continuously.

When the turn off time is reached, in step 407, the correlation channel 110 sleeps for an inactive period defined in the correlation schedule, during which step 409 is processed, the processor 108 periodically checks whether the turned off correlation channel 110 should be turned on. The correlation channel 110 may also be woken up when exceptional events such as rapid dynamics change or dead reckoning changes are sensed. When the turn on time is reached by schedule, the process loops to step 403.

Figure 5:
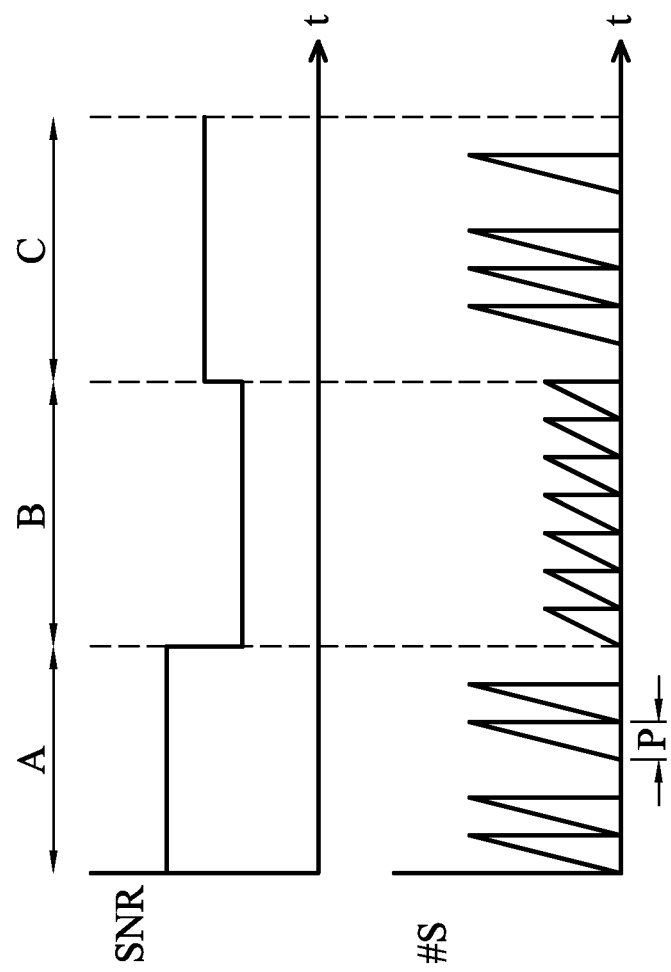
FIG. 5 shows a diagram of matrix accumulation under the correlation schedule of the invention.

FIG. 5 shows a diagram of matrix accumulation under the correlation schedule of the invention. The upper part shows SNR of the digital signal #D varying in time, and the lower part is one of the correlation results #S generated by a correlation channel 110. It is shown that the correlation result is reset and re-accumulated within a basic period P. The active period and inactive period are defined on the basis of the basic period P. The basic period P may be a multiple of the 20 ms coherent integration time. In section A, the SNR is deemed qualified. Thus the correlation channel 110 is turned on and off in a regular pattern presenting the duty cycle, for example, two on one off. In section B, the SNR is degraded. A more dedicated correlation process is required in this case, so the correlation channel 110 is scheduled to operate continuously. In section C, the SNR is better than that of section B, but worse than that of section A. In this case, the duty cycle is configured to be three on one off, which is more aggressive than the duty cycle in section A.

The correlation channels 110 described in the GNSS device, may be a plurality of identical hardware circuits or a software subroutine executed by the processor 108 with different channel variables. Alternatively, the correlation channel 110 can be implemented by only one hardware circuit to execute the plurality of correlation processes by time division multiplexing (TDM). The GNSS device may be part of a mobile device such as a cell phone or a PDA, and the power saving method implemented therein may be a software program interacting with an essential hardware such as a GPS receiver.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power saving method for a GNSS device, comprising:
   receiving satellite signals to perform a plurality of correlation processes each corresponding to a satellite;
   enabling/disabling at least one correlation process based on a corresponding correlation schedule, wherein the correlation schedule is aggressive in a weak condition of a corresponding satellite signal.

2. The power saving method as claimed in claim 1, further comprising:
   estimating a dilution of precision based on distribution of the satellites;
   acquiring position and dynamics of the GNSS device by the satellite signals; and
   calculating fixed accuracy of the GNSS device based on its position.

3. The power saving method as claimed in claim 2, further comprising estimating signal qualities for each satellite.

4. The power saving method as claimed in claim 3, wherein each correlation schedule comprises a period, and a duty cycle defining how long a correlation process should be enabled within the period.

5. The power saving method as claimed in claim 4, further comprising adjusting a duty cycle of a correlation schedule based on signal quality of a corresponding satellite, dynamics of the GNSS device, the dilution of precision, and fixed accuracy of the GNSS device.

6. The power saving method as claimed in claim 4, wherein the condition of the satellite signal is the signal quality of the corresponding satellite signal, and the duty cycle under weak signal quality is higher than the duty cycle under strong signal quality.

7. The power saving method as claimed in claim 4, wherein the condition of the satellite signal is the signal quality of the corresponding satellite signal, and the duty cycle decreases while the signal quality goes stronger, and the duty cycle increases while the signal quality goes weaker.

8. A GNSS device, for processing satellite signals obtained from a plurality of satellites, comprising:
a plurality of correlation channels, each performing a correlation process on the satellite signals to generate a correlation result corresponding to a satellite;
a memory device for storage of the correlation results;
a processor coupled to the memory device, performing acquisition and tracking based on the correlation results;
wherein each correlation channel is periodically turned on and turned off based on a corresponding correlation schedule, and the correlation schedule is aggressive in a weak condition of a corresponding satellite signal.

9. The GNSS device as claimed in claim 8, wherein:
the processor estimates a dilution of precision based on distribution of the satellites;
the processor acquires position and dynamics of the GNSS device using the correlation results; and
the processor calculates fixed accuracy of the GNSS device based on its position.

10. The GNSS device as claimed in claim 9, the processor further estimates signal qualities of each satellite.

11. The GNSS device as claimed in claim 10, wherein each correlation schedule comprises a period, and a duty cycle defining how long a correlation process should be enabled within the period.

12. The GNSS device as claimed in claim 11, wherein the processor adjusts a duty cycle of a correlation schedule based on signal quality of a corresponding satellite, dynamics of the GNSS device, the dilution of precision, and fixed accuracy of the GNSS device.

13. The GNSS device as claimed in claim 11, wherein the condition of the satellite signal is the signal quality of the corresponding satellite signal, and the duty cycle under weak signal quality is higher than the duty cycle under strong signal quality.

14. The GNSS device as claimed in claim 11, wherein the condition of the satellite signal is the signal quality of the corresponding satellite signal, and the duty cycle decreases while the signal quality goes stronger, and the duty cycle increases while the signal quality goes weaker.

15. A mobile device, comprising:
a GNSS device, for processing the satellite signals, comprising:
a plurality of correlation channels, each performing a correlation process on the satellite signals to generate a correlation result corresponding to a satellite;
a memory device for storage of the correlation results;
a processor coupled to the memory device, performing acquisition and tracking based on the correlation results;
wherein each correlation channel is periodically turned on and turned off based on a corresponding correlation schedule, and the correlation schedule is aggressive in a weak condition of a corresponding satellite signal.

16. The mobile device as claimed in claim 15, wherein:
the processor estimates a dilution of precision based on distribution of the satellites;
the processor acquires position and dynamics of the GNSS device using the correlation results; and
the processor calculates fixed accuracy of the GNSS device based on its position.

17. The mobile device as claimed in claim 16, the processor further estimates signal qualities of each satellite.

18. The mobile device as claimed in claim 17, wherein each correlation schedule comprises a period, and a duty cycle defining how long a correlation process should be enabled within the period.

19. The mobile device as claimed in claim 18, wherein the processor adjusts a duty cycle of a correlation schedule based on signal quality of a corresponding satellite, dynamics of the GNSS device, the dilution of precision, and fixed accuracy of the GNSS device.

20. The mobile device as claimed in claim 18, wherein the condition of the satellite signal is the signal quality of the corresponding satellite signal, and the duty cycle under weak signal quality is higher than the duty cycle under strong signal quality.

21. The mobile device as claimed in claim 18, wherein the condition of the satellite signal is the signal quality of the s corresponding satellite signal, and the duty cycle decreases while the signal quality goes stronger, and the duty cycle increases while the signal quality goes weaker.

* * * * *